United States Patent [19]

Borowczak et al.

[11] Patent Number: 5,225,457
[45] Date of Patent: Jul. 6, 1993

[54] REINFORCED POLYMER MATRIX AND PRODUCT CONTAINING MICRO AND MACRO REINFORCEMENT

[75] Inventors: Marc Borowczak, North Canton; Donald J. Burlett, Wadsworth; Richard G. Bauer, Kent; Joseph W. Miller, Jr., Akron, all of Ohio

[73] Assignee: The Goodyear Tire & Rubber Company, Akron, Ohio

[21] Appl. No.: 533,318

[22] Filed: Jun. 5, 1990

[51] Int. Cl.⁵ .................................................. C08K 7/00
[52] U.S. Cl. .................................. 523/220; 523/221; 524/34; 524/35
[58] Field of Search ............... 524/34, 35; 523/220, 523/221

[56] References Cited

U.S. PATENT DOCUMENTS

| | | | |
|---|---|---|---|
| 3,570,573 | 3/1971 | Marker et al. | 152/359 |
| 3,709,845 | 1/1973 | Boustany et al. | 523/220 |
| 3,968,182 | 7/1976 | Inoue et al. | 260/13 |
| 3,969,568 | 7/1976 | Sperley | 428/297 |
| 4,067,372 | 1/1978 | Masson | 152/354 R |
| 4,157,328 | 6/1979 | Beyer et al. | 523/220 |
| 4,161,470 | 7/1979 | Calundann | 260/40 P |
| 4,196,106 | 4/1980 | Matsuura et al. | 260/5 |
| 4,255,296 | 3/1981 | Ogawa et al. | 260/5 |
| 4,257,468 | 3/1981 | Ogawa et al. | 152/209 R |
| 4,328,133 | 5/1982 | Ogawa et al. | 524/505 |
| 4,396,051 | 8/1983 | Ogawa et al. | 151/203 |
| 4,524,160 | 6/1985 | Maeda et al. | 523/220 |
| 4,622,351 | 11/1986 | Van | 523/220 |
| 4,703,086 | 10/1987 | Yamamoto et al. | 525/133 |
| 4,728,698 | 3/1988 | Isayev et al. | 525/439 |
| 4,746,688 | 5/1988 | Bistak et al. | 523/220 |
| 4,835,047 | 5/1989 | Isayev et al. | 428/294 |
| 4,871,004 | 10/1989 | Brown et al. | 152/209 R |
| 4,962,136 | 10/1990 | Peters | 523/220 |

FOREIGN PATENT DOCUMENTS

| | | |
|---|---|---|
| 0030417 | 6/1981 | European Pat. Off. |
| 2144807 | 1/1973 | France. |
| 1292748 | 10/1972 | United Kingdom. |

*Primary Examiner*—Paul R. Michl
*Assistant Examiner*—Edward Cain
*Attorney, Agent, or Firm*—David E. Wheeler

[57] ABSTRACT

A method of mixing micro and macro fibers into a polymer matrix and products made thereby are provided. In the illustrated method, a micro reinforcing polymer is mixed with an elastomeric base polymer and preformed macro fibers are added thereto. In one embodiment, the micro reinforcing polymer forms micro fibers in a resulting elastomeric matrix which is interspersed with macro fibers. A base polymer matrix interspersed with micro reinforcing polymer and macro fibers made according to the invention can be used in reinforced elastomeric products such as tires.

17 Claims, 11 Drawing Sheets

FIG-7 MICRO/MACRO COMPOUND REINFORCEMENT ENGINEERING PROPERTIES

FIG-9

REINFORCED POLYMER MATRIX AND PRODUCT CONTAINING MICRO AND MACRO REINFORCEMENT

BACKGROUND

The invention relates to a method for processing reinforced polymer, reinforced polymer made by said method, and tires made using said reinforced polymer.

The use of macro short fiber (0.05 mm to 10 mm in length with an aspect ratio of 50-100) reinforced polymers to make V-belts, tires and other composite polymer articles is well known in the art. Such prior art composites comprise a rubber composition (for example styrene butadiene rubber (SBR), polyisoprene, polybutadiene, polychloroprene, nitrile butadiene rubber (NBR), ethylene propylene diene monomer rubber (EPDM), natural rubber and mixtures thereof), which has been loaded with chopped or crushed fiber made from, for example, spun polyaramide (e g. Kevlar ®, available from E.I. Dupont de Nemours & Company, Inc., Wilmington, Del.), spun amide, spun nylon 6 (1,6 polycaprolactam available from Allied Chemical, Morristown, N.J.), polybenzimidazole fibers, spun polyesters (e.g. polyethylene terephthalate (PET), also available from Allied Chemical).

It is also known in the prior art that it is difficult to mix most macro fibers into a rubber compound since the fibers have a tendency to mat and good dispersion requires many mixing steps. Also, macro fiber loading may limit the usefulness of a composite rubber for certain applications since a rubber loaded with macro fibers cannot be extruded to the small dimensions required for use in an apex, for example (i.e. because of the macro fiber, the rubber cannot be feathered to the small dimension required in the peak of the apex.)

Kevlar ®, for example, is ordinarily mixed at a maximum useful load of about six (6) phr (6 parts by weight per hundred parts by weight rubber). It is known in the prior art to load a rubber compound with about 15-40 phr Kevlar ® when used in a V-belt or hose, where no small dimensions of rubber are required.

Micro fibers (0.1 um to 10 um in length with an aspect ratio of 1-5) can be formed in situ or dispersed in a polymer matrix. (When incorporated into an article of manufacture, the micro fibers may be further elongated, the amount of elongation depending on the manner in which the rubber composite is processed.) Isayev et al, for example, in U.S. Pat. No. 4,728,698, teach the in-situ formation of fibers in a polymer matrix by the addition of a liquid crystal polymer to a base polymer followed by mixing and extrusion.

It has been shown that the orientation of macro fibers in a polymer matrix can be controlled by the mixing and/or extrusion of a base polymer containing such fibers. The orientation of fibers in a polymer matrix improves the modulus (stiffness) of the polymer in the direction parallel to the direction of orientation. The presence of fibers also improves the cut resistance properties, load bearing properties, and green strength of the polymer. On the other hand, composites loaded with macro fibers tend to have a relatively higher hysteresis, which might limit the efficiency of the composite, especially when used in rubber articles that undergo large numbers of flexes in use.

Orientation of micro fibers is more difficult to obtain, but even so, micro fiber composites without anisotropy improve the stiffness of a rubber compound while contributing little to the hysteresis of the compound. Micro fiber loaded composites have a lower hysteresis than comparable composites loaded with carbon black or macro fibers.

Accordingly, it is an object of the present invention to provide a method by which the properties of a rubber composite can be optimized for a particular use by adjusting the amount of macro fibers, micro fibers and other reinforcing fillers (such as carbon black, silica, etc.) in the composite. It is a further object of the invention to provide a rubber composite with a reduced macro fiber load which has properties substantially equivalent to a prior art composite having a higher macro fiber load by replacing some of the macro fibers with micro fibers. The method simplifies mixing macro fibers into the composite since lower concentrations of macro fibers are used, and the compound therefore is easier to mix.

Additional objects are to provide a new polymer blend that includes macro fibers and micro fibers, and elastomeric products incorporating such a polymer blend.

Other objects of the invention will be apparent from the following description.

Definitions

As used herein, "axially oriented" refers to fiber orientation substantially parallel to the specimen's axis of symmetry.

"Planar orientation" refers to fiber orientation substantially parallel to a plane perpendicular to the axis of symmetry.

"Natsyn ®" refers to synthetically made cis-polyisoprene rubber (a molecular makeup similar to natural rubber).

"Viscoelastic" refers to a complex (both elastic and viscous) response of the material (stress or strain), e.g. observable as a delayed stress response to strain.

"Anisotropy index" refers to the ratio of some physical property, measured in the direction of processing, divided by a similar value obtained by a measurement in a direction perpendicular to processing.

"G'" is the elastic modulus of a viscoelastic material.

"G''" is the viscous modulus of the viscoelastic material.

"Set" refers to the fraction of permanent deformation that remains when an elastomer is deformed.

SUMMARY OF THE INVENTION

A method of processing reinforced polymers is provided. The method comprises blending a 1-50% by weight micro reinforcing polymer, based on the total weight of the composition, with a base polymer, and mixing macro short fibers into the resulting micro reinforcing polymer/base polymer blend during a separate mixing step.

In one embodiment, the micro reinforcing polymer will be chosen to have properties whereby the micro reinforcing polymer retains its identity while mixing with the base polymer and forms micro fibers in-situ in the polymer blend. The orientation of the macro fibers in the polymer may be controlled by extruding or calendering the polymer blend. The orientation of the micro fibers may be controlled by other processing.

Also provided is a polymer blend comprising a base polymer, a micro reinforcing polymer and macro short fibers. In one embodiment, the micro reinforcing polymer will be present in the polymer blend in the form of micro fibers dispersed in the base polymer. It is also preferred that the macro fibers be directionally oriented.

Also provided is a pneumatic tire made using the polymer blend of the invention.

DETAILED DESCRIPTION OF THE INVENTION

The invention relates to a method of processing reinforced polymers and polymers produced by said method. In particular, the invention relates to base polymers which are reinforced by macro short fibers and micro short fibers.

Base polymers, for example elastomers such as polyisoprene rubber, styrene butadiene rubber (SBR), polybutadiene rubber, nitrile butadiene rubber (NBR), polychloroprene rubber, natural rubber, EPDM (ethylene propylene diene monomer rubbers), and mixtures thereof, when mixed with macro short fibers (e.g. polyamides, polyesters, polyolefins, cellulosic fibers, polyimides, polyurea, polyurethane and polybenzimidazole and mixtures thereof, which have been spun or processed into a fiber and optionally cut and crushed to have a length of 0.05 mm to 10 mm and an aspect ratio of 50 to 100) exhibit improved strength properties such as cut growth resistance, tensile strength, green strength and improved stiffness over such properties of the base polymer alone.

Micro reinforcing polymer may be mixed into the elastomeric base polymer at conventional compounding temperatures when chemically preparing the reinforcing polymer in-situ, or at a temperature above the melting point of the polymer when a thermoplastic polymer is used to melt form the reinforcing polymer. It has been found in accordance with the present invention that micro reinforcing polymer may comprise 1–50%, preferably 10–40%, and most preferably 15–30% of a resulting base-polymer-elastomer/micro-reinforcing-polymer blend.

Examples of micro reinforcing polymers which may be used to provide the polymer blends of the invention include liquid or powder thermoplastic polymers. Examples of such polymers are polyamides, polyesters, polyolefins, polyurethanes, and mixtures thereof. Examples of other polymers which may be used include polyimides, polyimidazoles, polyurea and liquid crystal polymers. Such polymers have the ability to retain their own identity when being mixed with the base polymer, and accordingly are mixable with the base polymer while not being miscible.

Some thermoplastic polymers are capable of forming micro fibers in the matrix of the base polymer.

Figure 1:
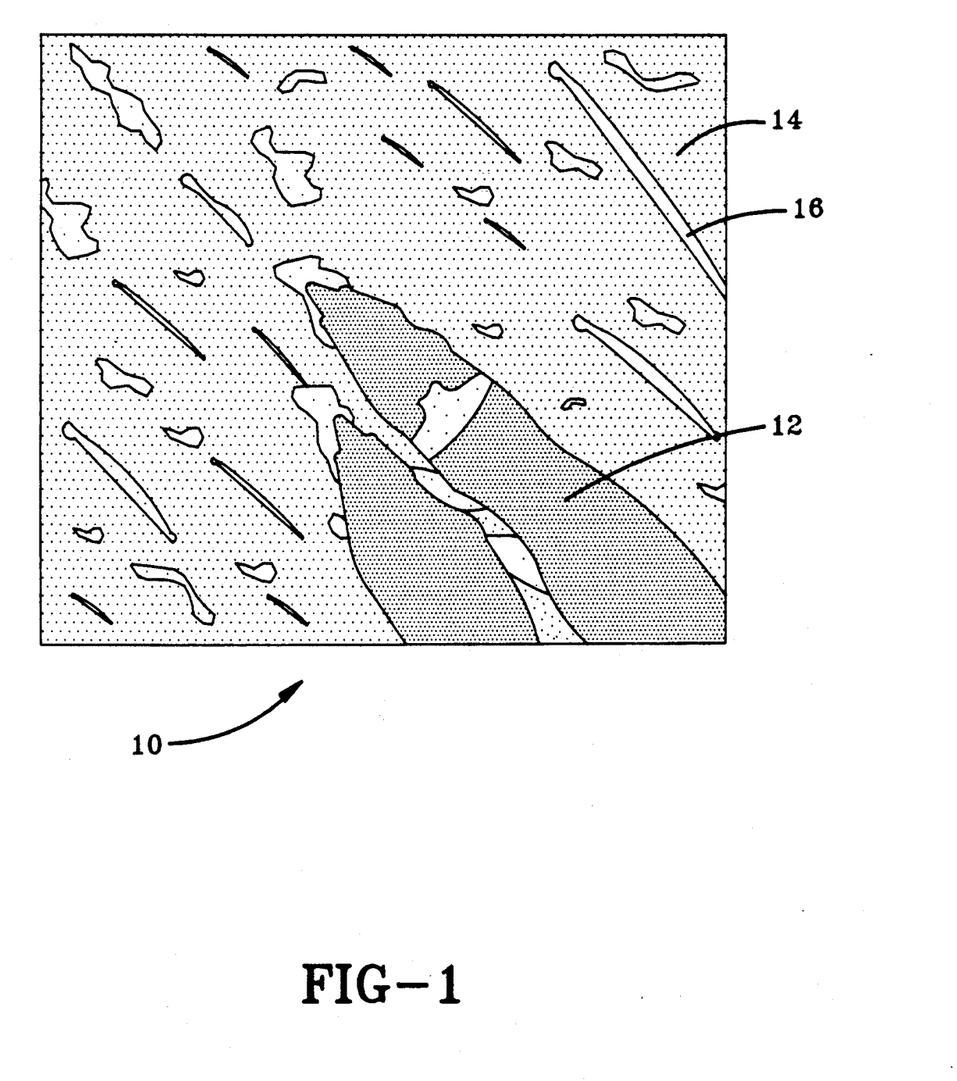
FIG. 1 illustrates a micrograph of the polymer blend of the invention showing micro fibers and macro fibers.

With reference now to FIG. 1, a micrograph of a reinforced elastomer 10 of the invention is illustrated. A macro fiber 12 (Kevlar ®, a polyaramide, in the illustrated embodiment) is encompassed by elastomer 14 and surrounded by a plurality of oriented micro reinforcing polymer fibrils 16. It has been found that the micro fibrils may be oriented in the elastomer during curing in a mold, for example a tire mold, when the elastomer is stretched to meet the contour of the mold and the elastomer is cured to set or form a matrix around the micro fibrils. In a cured product, such as that illustrated in FIG. 1, the aspect ratio of the micro fibrils may be 10 to 250 or higher.

In an illustrated embodiment of the method of the invention, 50–99% by weight base polymer and 1–50% by weight thermoplastic polymer and 1-8 phr macro short fibers are mixed with conventional compounding agents in an extruder or other internal mixer and mixed for 1–10 minutes. The mixture is then fabricated into tire components.

Optionally 0–3% by weight grafting agent may be added to the polymer blend to provide polymeric compatiblizing and potential linking between the base polymer and the micro reinforcing polymer. When linkage between the micro reinforcing polymer and base polymer is desired and obtained, it is believed that an exemplary mechanism by which linkage is obtained may be illustrated, using polyisoprene as an exemplary base polymer, nylon 12 as a micro reinforcing thermoplastic polymer, and dithiodipropionic acid as a grafting agent, according to the following formula:

Another exemplary grafting agent is maleic anhydride which, it is believed, most likely reacts as shown below:

When the macro fibers are added to the polymer blend during compounding, the same parameters used in conventional rubber compounding are maintained. According to the present invention, it is possible to load the base polymer with 1-40, preferably 1-15 phr (parts by weight per hundred parts by weight rubber) of Kevlar ® short fibers together with various percentages of micro reinforcing polymer to obtain useful reinforced products. The method of the invention may also be used to make a masterbatch of a micro/macro reinforced polymer that may contain about 50% macro fibers (e.g. Kevlar ®).

It has been found that the presence of micro fibers in a polymer matrix provides higher modulus properties to the matrix, i.e., the micro fibers act as a filler, and such micro fiber forming compounds may be used in place of carbon black in rubber compounds to increase or maintain the stiffness of the composition while providing a composition with a relatively lower hysteresis.

In general, micro fibers have the advantages that they are reinforcing, have a low hysteresis and are easily processed, whereas they have the disadvantage that they do not exhibit significant anisotropy even when they are oriented, and some demonstrate poor cut growth properties when used in a polymer matrix. Macro fibers, on the other hand are reinforcing, are anisotropic, and demonstrate excellent cut growth properties although they have a relatively higher hysteresis and are difficult to process. A polymer composition containing micro fibers and macro fibers demonstrates the advantages of the micro and macro fibers while minimizing the disadvantages of both.

Figure 2:
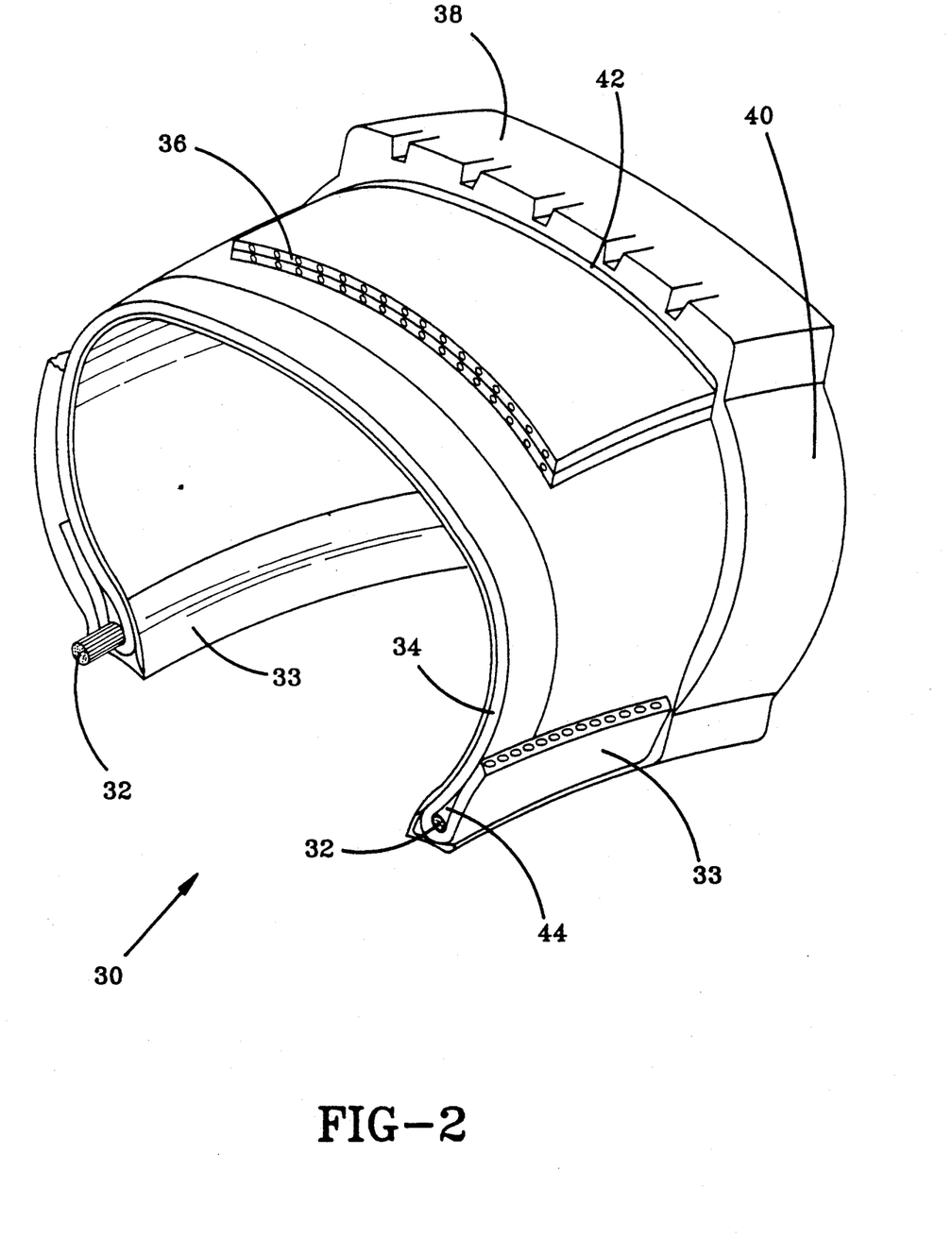
FIG. 2 illustrates a pneumatic tire made using the polymer blend of the invention, and the various parts thereof which may contain the polymer blend.
Figure 3:
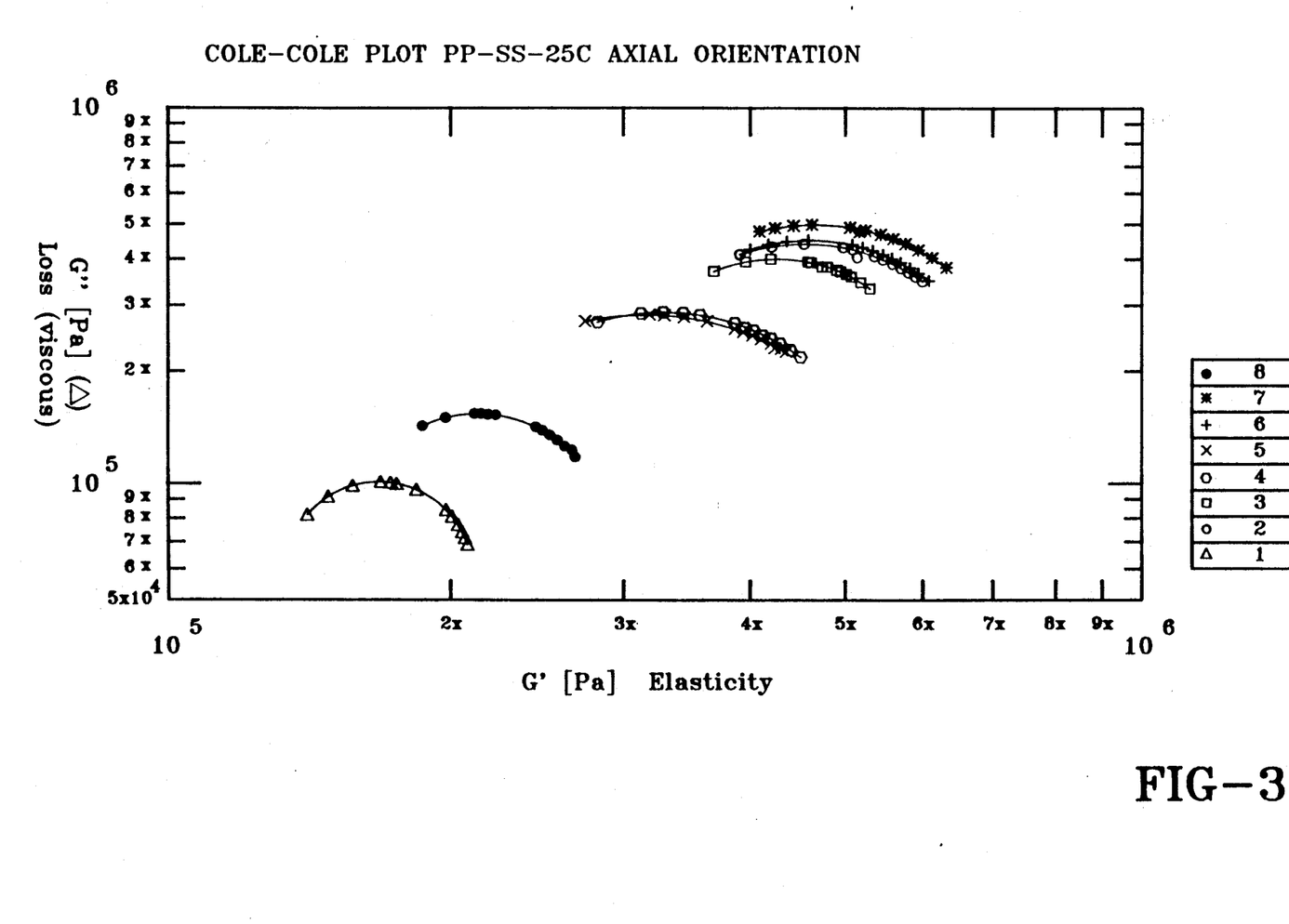
FIG. 3 illustrates viscoelasticity data obtained on rubber samples having axially oriented various fiber loadings obtained at 25° C.
Figure 3A:
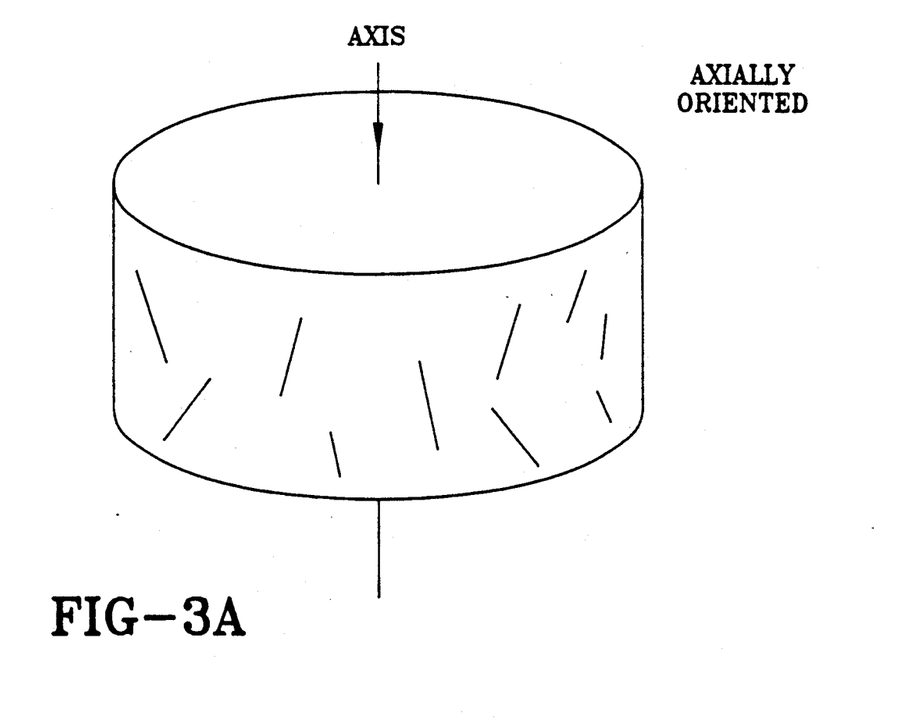
FIG. 3a illustrates a round, flat rubber sample having axially oriented fibers.
Figure 4:
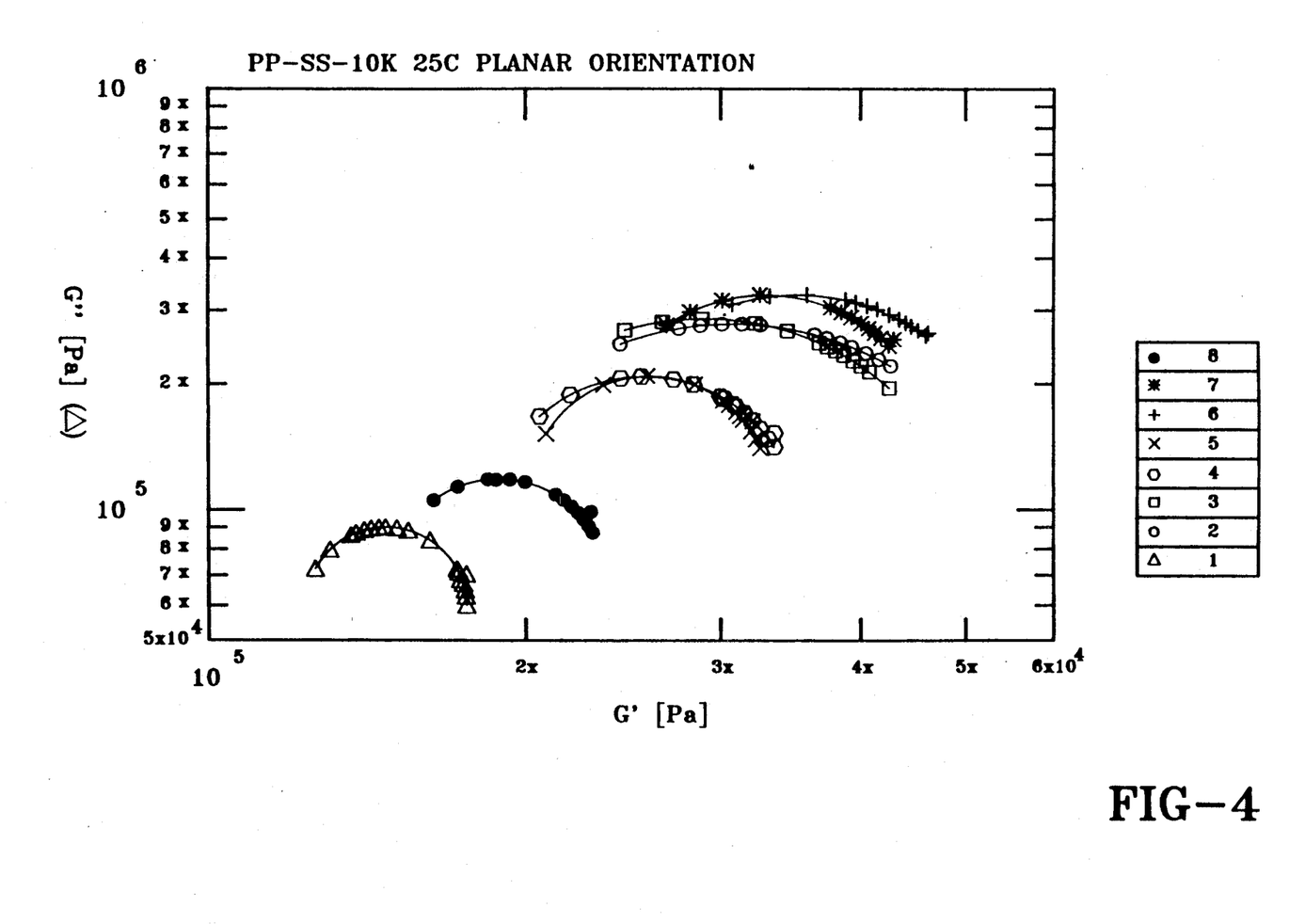
FIG. 4 illustrates viscoelasticity data obtained on samples with planar oriented fiber samples obtained at 25° C.
Figure 4A:
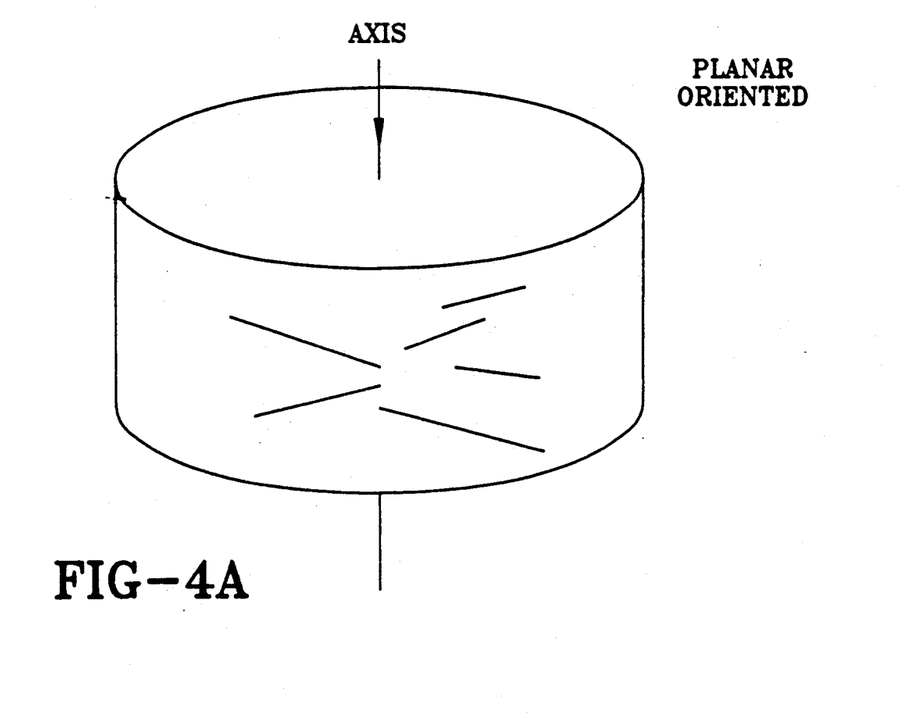
FIG. 4a illustrates a round, flat rubber sample having planar oriented fibers.
Figure 5:
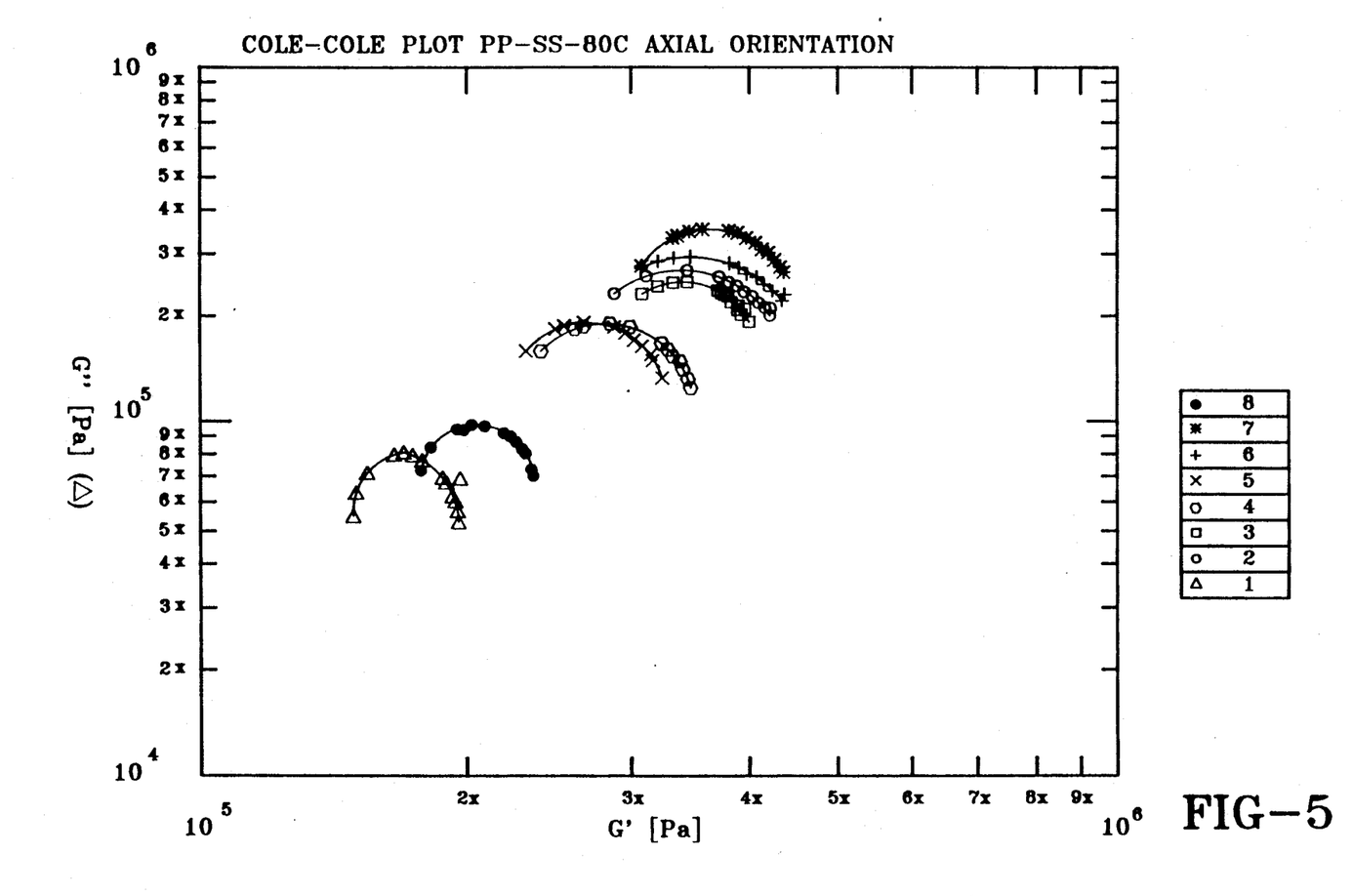
FIG. 5 illustrates viscoelasticity data for samples having axially oriented fibers at 80° C.
Figure 6:
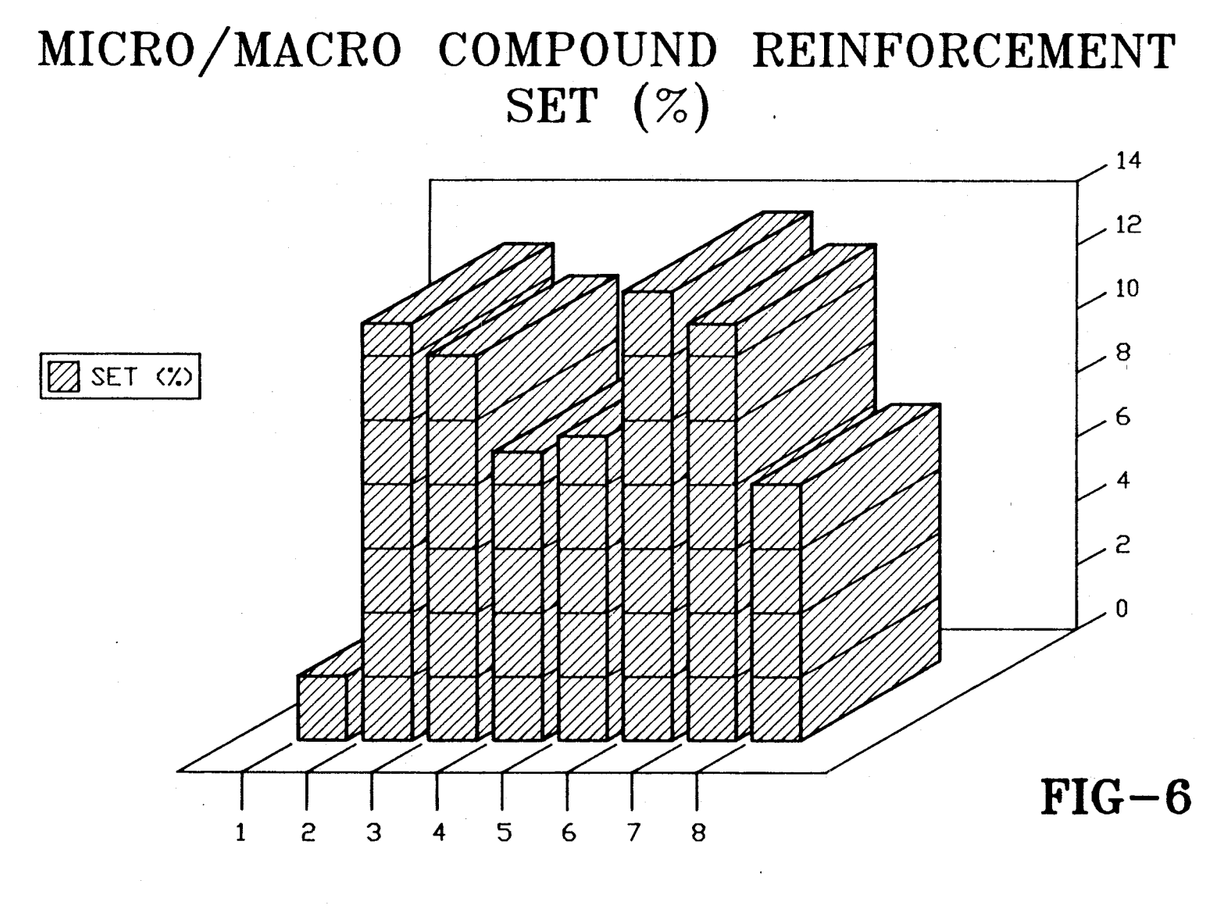
FIG. 6 illustrates set data for fiber loaded samples.

With reference now to FIG. 2, a pneumatic tire 30 which is made using the reinforced elastomer of the invention is illustrated. It is believed that the reinforced polymer blends made according to the invention may be used in various components of a pneumatic tire. In the illustrated embodiment, tire 30 comprises a pair of beads 32, carcass plies 34 wrapped around beads 32, belts or breakers 36 disposed over carcass plies 34 in a crown area tire, tread 38 disposed over belts or breakers 36, and sidewalls 40 disposed between tread 38 and beads 32. Fiber loaded polymer blends may be used in the tread base 42 (a rubber compound disposed between the belt plies and the tread rubber) to reduce cut growth, and reduce hysteresis, improve resistance to penetration by foreign objects, and improve stiffness and handling. Such blends can be used in the tread 38 to reduce chipping and chunking and improve rolling resistance; the belt package (which includes all the belt or breaker plies 36 and any overlays) to increase stiffness and improve cut growth and cracking properties; the apex 44 to stiffen the apex and reduce hysteresis; the sidewall 40 to increase toughness against bruises and cutting; and the bead area 33 to improve stiffness and improve cut growth properties.

It is believed that an elastomeric composition employing macro fibers and micro reinforcing polymer can be used to reduce the need for an overlay in a tire since such a composition can be used to increase the stiffness of the belt package. It is believed that the gauge of the belt package can be reduced and the fabric in the overlay can be reduced, and possibly the overlay can be eliminated.

The method and composition of the invention is further illustrated by the following examples.

EXAMPLE 1

In this example, the properties of various compositions are compared (Tables I-III) to demonstrate the effect caused by micro fiber loading and macro fiber loading in various compositions.

Each of the samples was prepared using conventional rubber accelerators, carbon black, sulfur, oil, antiozonants, antioxidants, initiators and fillers. Natural rubber (sample no. 1 in the tables) was used as a control.

Rheometer data was obtained as is conventional in the art. "min Torq" represents the point of minimum viscosity in the cure curve. "Delta Torq" represents the maximum increase in torque from the minimum torque. "$t_{90}$" represents the cure time in minutes needed to obtain 90% of the "Delta Torq".

50% modulus (MOD) was obtained from Instron data for each sample in the direction of milling or calendering, i.e. the machine direction (With), and in the direction perpendicular to the machine direction (Against). All data is provided in Mega Pascals (MPa). The HETERO INDEX is the ratio of MOD With/MOD Against. U.T. is the ultimate tensile strength. E.B. represents the percent elongation at break.

Nylon/Natsyn ® is a micro reinforcing thermoplastic polymer which comprises a blend of 20% nylon 12 and 80% natsyn. Natsyn ® is synthetic cis-polyisoprene rubber.

Hyt/Natsyn ® is a micro reinforcing thermoplastic polymer which comprises a blend of 33% polybutylene terephthalate poly tetramethylene glycol copolymer (Hytrel ® 5555 from DuPont, Wilmington, Del.) and 67% Natsyn ®.

POY Nylon is a partially oriented yarn (nylon 6) which is available from Allied Chemical, Morristown, N.J.

Chop PET is chopped polyethylene terephthalate fiber, also available from Allied Chemical.

KEV PULP in Table III was provided from Wyrough & Loser, Trenton, N.J., in a masterbatch containing 50% KEVLAR ®.

Each of the formulations described in the Tables contain, in addition to the ingredients listed in the Tables:
10 phr ZnO 28 phr carbon black
17 phr silica
2 phr oil
2.75 phr antioxidant
2 phr antiozonant
2 phr accelerator
3 phr coupler
5 phr sulfur

TABLE I

| MATERIALS: | | 1 | 2 | 3 | 4 | 5 | 6 | 7 |
|---|---|---|---|---|---|---|---|---|
| Natural rubber (phr) | | 100 | 40 | 60 | 60 | 60 | 60 | 80 |
| Nylon/Natsyn ® (phr) | | | 75 | 50 | 50 | 50 | 50 | |
| Hyt/Natsyn ® (phr) | | | | | | | | 30 |
| KEV PULP (phr) | | | | 1 | | | | 1 |
| Chop Nylon (phr) | | | | | 1 | | | |
| POY Nylon (phr) | | | | | | 1 | | |
| Chop PET (phr) | | | | | | | 1 | |
| RHEOMETER | | | | | | | | |
| Min. Torq | | 10.3 | 12.0 | 11.8 | 10.9 | 11.2 | 10.8 | 9.9 |
| Delta Torq | | 31.8 | 42.8 | 39.0 | 38.3 | 38.3 | 39.0 | 36.4 |
| t90 (min.) | | 15.4 | 16.1 | 15.2 | 15.7 | 15.6 | 15.4 | 15.7 |
| INSTRON 50% MOD | | | | | | | | |
| With (MPa) | | 1.42 | 3.60 | 3.37 | 2.85 | 3.02 | 3.62 | 2.57 |
| Against (MPa) | | 1.46 | 2.57 | 2.61 | 2.16 | 2.25 | 2.42 | 2.25 |
| HETERO INDEX | | .97 | 1.40 | 1.29 | 1.32 | 1.34 | 1.50 | 1.11 |
| U.T. - With (MPa) | | 26.4 | 21.7 | 18.3 | 21.3 | 21.2 | 22.7 | 23.2 |
| E.B. (%) - With | | 465 | 360 | 315 | 395 | 385 | 385 | 440 |
| RHEOVIBRON | | | | | | | | |
| tan delta (0° C.) | A | .080 | .084 | .081 | .083 | .082 | .084 | .087 |
| | W | .073 | .086 | .083 | .084 | .077 | .082 | .092 |
| tan delta (60° C.) | A | .041 | .061 | .051 | .049 | .051 | .049 | .036 |
| | W | .036 | .069 | .055 | .053 | .056 | .050 | .041 |
| MONSANTO PROCESSABILITY TESTER (MPT) DATA | | | | | | | | |
| Pressure KPSI | | | | | | | | |
| @ 0.10 in/min linear rate | | 1.93 | 2.14 | 2.12 | 1.96 | 2.10 | 2.05 | 2.05 |
| @ 0.33 in/min linear rate | | 2.35 | 2.64 | 2.60 | 2.50 | 2.56 | 2.54 | 2.46 |
| @ 1.10 in/min linear rate | | 2.68 | 2.98 | 2.95 | 2.86 | 2.92 | 2.90 | 2.82 |
| @ 3.60 in/min linear rate | | 3.32 | 3.51 | 3.59 | 3.44 | 3.59 | 3.57 | 3.48 |
| % Swell Relax | | | | | | | | |
| @ 0.10 in/min linear rate | | 21.7 | 8.2 | 9.9 | 10.8 | 10.2 | 10.4 | 13.8 |
| @ 0.33 in/min linear rate | | 19.7 | 7.8 | 10.7 | 12.3 | 11.7 | 9.5 | 13.9 |
| @ 1.10 in/min linear rate | | 21.1 | 10.2 | 7.8 | 11.9 | 9.5 | 10.3 | 15.8 |
| @ 3.60 in/min linear rate | | 26.8 | 9.2 | 11.7 | 15.0 | 12.8 | 14.4 | 18.8 |
| Viscosity kPa sec | | | | | | | | |
| @ 0.10 in/min linear rate | | 13.6 | 15.0 | 14.9 | 13.8 | 14.8 | 14.4 | 14.4 |
| @ 0.33 in/min linear rate | | 5.0 | 5.6 | 5.5 | 5.3 | 5.5 | 5.4 | 5.2 |
| @ 1.10 in/min linear rate | | 1.7 | 1.9 | 1.9 | 1.8 | 1.9 | 1.9 | 1.8 |
| @ 3.60 in/min linear rate | | 0.6 | 0.7 | 0.7 | 0.7 | 0.7 | 0.7 | 0.7 |

TABLE II

| MATERIALS | | 1 | 2 | 3 | 4 | 5 | 6 | 7 | 8 | 9 | 10 |
|---|---|---|---|---|---|---|---|---|---|---|---|
| Natural Rubber (phr) | | 100 | 60 | 60 | 60 | 60 | 60 | 80 | 80 | 80 | 80 |
| Nylon/Natsyn ® (phr) | | | 50 | 50 | 50 | 50 | 50 | | | | |
| Nyt/Natsyn ® | | | | | | | | 30 | 30 | 30 | 30 |
| Chop Nylon (phr) | | | | | 6 | | | | 6 | | |
| POY Nylon (phr) | | | | 1 | | 6 | | | | 6 | |
| Chop PET (phr) | | | | | 6 | | | | 6 | | 6 |
| RHEOMETER | | | | | | | | | | | |
| Min. Torq | | 10.7 | 11.4 | 11.0 | 12.9 | 13.0 | 13.0 | 10.0 | 12.1 | 11.7 | 12.3 |
| Delta Torq | | 31.6 | 38.8 | 38.5 | 39.1 | 33.5 | 38.0 | 36.5 | 37.5 | 37.1 | 35.9 |
| t90 (min.) | | 15.2 | 15.9 | 15.6 | 16.3 | 14.6 | 16.5 | 15.6 | 16.6 | 17.0 | 16.2 |
| INSTRON 50% MOD | | | | | | | | | | | |
| With (MPa) | | 1.34 | 2.68 | 3.02 | 7.42 | 5.03 | 5.48 | 2.22 | 6.48 | 5.14 | 3.93 |
| Against (MPa) | | 1.32 | 2.05 | 2.04 | 2.05 | 1.92 | 2.15 | 1.77 | 2.44 | 2.12 | 2.33 |
| HETERO INDEX | | 1.02 | 1.31 | 1.48 | 3.62 | 2.62 | 2.55 | 1.25 | 2.66 | 2.42 | 1.69 |
| U.T. - With (MPa) | | 25.3 | 24.5 | 20.5 | 16.9 | 15.7 | 17.0 | 23.6 | 18.0 | 16.7 | 17.1 |
| E.B. (%) - With | | 475 | 415 | 385 | 295 | 310 | 305 | 455 | 348 | 340 | 365 |
| RHEOVIBRON | | | | | | | | | | | |
| tan delta (0° C.) | A | .082 | .081 | .087 | .093 | .092 | .081 | .086 | .094 | .095 | .096 |
| | W | .086 | .081 | .080 | .071 | .080 | .077 | .096 | .086 | .077 | .085 |
| tan delta (60° C.) | A | .035 | .045 | .044 | .049 | .049 | .044 | .037 | .036 | .038 | .037 |
| | W | .030 | .054 | .052 | .046 | .051 | .052 | .042 | .036 | .048 | .046 |

TABLE III

| MATERIALS | 1 | 2 | 3 | 4 | 5 | 6 | 7 | 8 |
|---|---|---|---|---|---|---|---|---|
| Natural Rubber (phr) | 100 | 60 | 60 | 80 | 80 | 60 | 60 | 100 |

TABLE III-continued

| MATERIALS | | 1 | 2 | 3 | 4 | 5 | 6 | 7 | 8 |
|---|---|---|---|---|---|---|---|---|---|
| Nylon/Natsyn ® (phr) | | | 50 | 50 | | | 50 | 50 | |
| Hyt/Natsyn ® (phr) | | | | | 30 | 30 | | | |
| Chop Nylon (phr) | | | 6 | | 6 | | | | |
| POY Nylon (phr) | | | | 6 | | 6 | 3 | | 6 |
| 50% Kevlar ® masterbatch (phr) from Wyrough & Loser | | | | | | | 6 | 12 | |
| RHEOMETER | | | | | | | | | |
| Min. Torq | | | 7.3 | 11.3 | 10.2 | 9.9 | 10.0 | 11.2 | 11.2 | 10.1 |
| Delta Torq | | | 33.9 | 38.7 | 39.9 | 37.7 | 36.5 | 38.5 | 39.4 | 34.8 |
| $t_{90}$ | | | 15.1 | 16.9 | 16.6 | 15.5 | 16.3 | 16.5 | 16.1 | 14.9 |
| INSTRON | | | | | | | | | | |
| Modulus | | | | | | | | | | |
| 50% | A | 1.4 | 4.9 | 2.9 | 3.3 | 2.4 | 3.5 | 3.1 | 2.6 |
| | W | 1.5 | 6.3 | 5.3 | 4.3 | 4.5 | 4.4 | 4.3 | 4.6 |
| 300% | A | 12.5 | 14.0 | 12.0 | 13.1 | 12.5 | * | 13.0 | 12.9 |
| | W | 13.5 | * | * | 13.2 | 14.3 | 14.0 | 13.5 | 15.6 |
| Ultimate | A | 28.9 | 14.2 | 12.5 | 13.2 | 14.6 | 13.5 | 13.7 | 14.9 |
| | W | 20.5 | 14.1 | 14.0 | 14.3 | 14.4 | 14.1 | 13.8 | 16.8 |
| Elongation at | A | 510 | 300 | 305 | 305 | 350 | 295 | 325 | 330 |
| Break (%) | W | 420 | 280 | 255 | 335 | 310 | 305 | 310 | 325 |
| Hetero Index | | | 1.07 | 1.29 | 1.83 | 1.30 | 1.88 | 1.26 | 1.39 | 1.77 |
| RHEOVIBRON | | | | | | | | | | |
| tan delta (0° C.) | A | .080 | 0.92 | .090 | .092 | .094 | .097 | .100 | .080 |
| | W | .080 | .083 | .082 | .087 | .090 | .094 | .100 | .074 |
| tan delta (60° C.) | A | .020 | .054 | .050 | .041 | .040 | .056 | .057 | .031 |
| | W | .020 | .050 | .055 | .039 | .041 | .055 | .065 | .036 |

*Failure occurred before 300% elongation.

The data in the tables illustrate that the modulus of a rubber composite may be increased using either a micro reinforcing polymer or a macro short fiber (TABLE I) (compare samples 3, 4 and 5 with sample 1), and that the modulus can be maintained by changing the ratio of the micro reinforcing polymer and macro materials. Compare sample 2 with samples 3 and 6.

Also illustrated is the fact that these materials have almost no effect on cure rate, and hysteresis is controlled throughout the series. Anisotropy is controlled by the amount of macro fiber used in the composite.

EXAMPLE 2

This example illustrates additional properties of the series of compounds illustrated in Table III. The anisotropy index, viscoelasticity, ultimate properties, fracture properties and set properties were observed.

Two types of micro fibers (Nylon/Natsyn ® and PET/Natsyn ®) at the 10 phr micro fiber level, and three types of macro fibers (Chopped Nylon, POY/Nylon and Kevlar ® (W&L Masterbatch)) were used. To provide a standard of comparison for the micro-macro fiber formulation properties, a macro fiber formulation containing POY/Nylon was included.

Two types of specimen geometries were prepared for testing viscoelastic, engineering and fracture properties. Parallel plate and pure shear specimens were cured at the compound's respective t90's at 150° C. For each geometry, two fiber orientations were attempted. Parallel plates were prepared with fibers preferentially oriented in the axial and in the planar directions.

Pure shear specimens were prepared "with" and "against" the machined direction of processed sheets. The manner in which the sample is prepared affects the fiber orientation in the specimen.

The Anisotropy index (obtained from elastic shear modulus) was dependent upon the macro fiber type (1.54 Kevlar ® vs 1.3 for the Nylons), and was slightly higher for POY containing compounds than conventional macro fibers.

TABLE V

| ANISOTROPY INDEX | | | | | |
|---|---|---|---|---|---|
| Dynamic Strain Amplitude (%) | 0.1 | 1.0 | 5.0 | 10.0 | 20.0 |
| Compound 1 | 1.13 | 1.12 | 1.10 | 1.09 | 1.06 |
| 2 | 1.30 | 1.29 | 1.27 | — | — |
| 3 | 1.31 | 1.31 | 1.31 | — | — |
| 4 | 1.31 | 1.29 | 1.28 | 1.27 | — |
| 5 | 1.37 | 1.35 | 1.28 | 1.24 | — |
| 6 | 1.42 | 1.39 | 1.35 | — | — |
| 7 | 1.54 | 1.49 | 1.39 | — | — |
| 8 | 1.17 | 1.17 | 1.17 | 1.17 | — |

Viscoelasticity data, obtained at 25° C. in samples in which the fibers had axial and planar orientation (FIGS. 3, 3a, 4 and 4a), and 80° C. in a sample having axial fiber orientation (FIG. 5), indicate simultaneous increase in elastic and loss moduli when adding macro fibers, or a combination of micro-macro fibers to the rubber compound. The numbers in FIGS. 3–10 represent the formulations illustrated in Table II. The Hyt/Natsyn ® containing compound presented both lower elastic and loss moduli than the corresponding Nylon/Natsyn ® formulations. A noticeable broadening of the loss modulus peak was observed at 25° C. for all compounds containing micro and macro fibers. This effect was practically nonexistent at 80° C. Temperature effects on elastic and loss moduli indicate all micro/macro fiber combinations led to larger decay of G' and G" (between 25° C. and 80° C.) than the control compound.

TESTING

Viscoelasticity characterization was performed at 25° C. using the two types of parallel plate specimens described above. The specimens were tested from a low of 0.1% dynamic strain amplitude up to the transducer range limit (29% dynamic strain for the control, 20% for the PET-Natsyn ® containing compounds and the single fiber formulations, less than 10% dynamic strain for the micro-macro fibers compounds). The specimen prepared with fiber axial orientations were also characterized at 80° C., in order to determine temperature dependencies of elastic and loss moduli. Anisotropy index were then determined from the ratios of elastic moduli obtained from axial vs. planar specimens.

Figure 7:
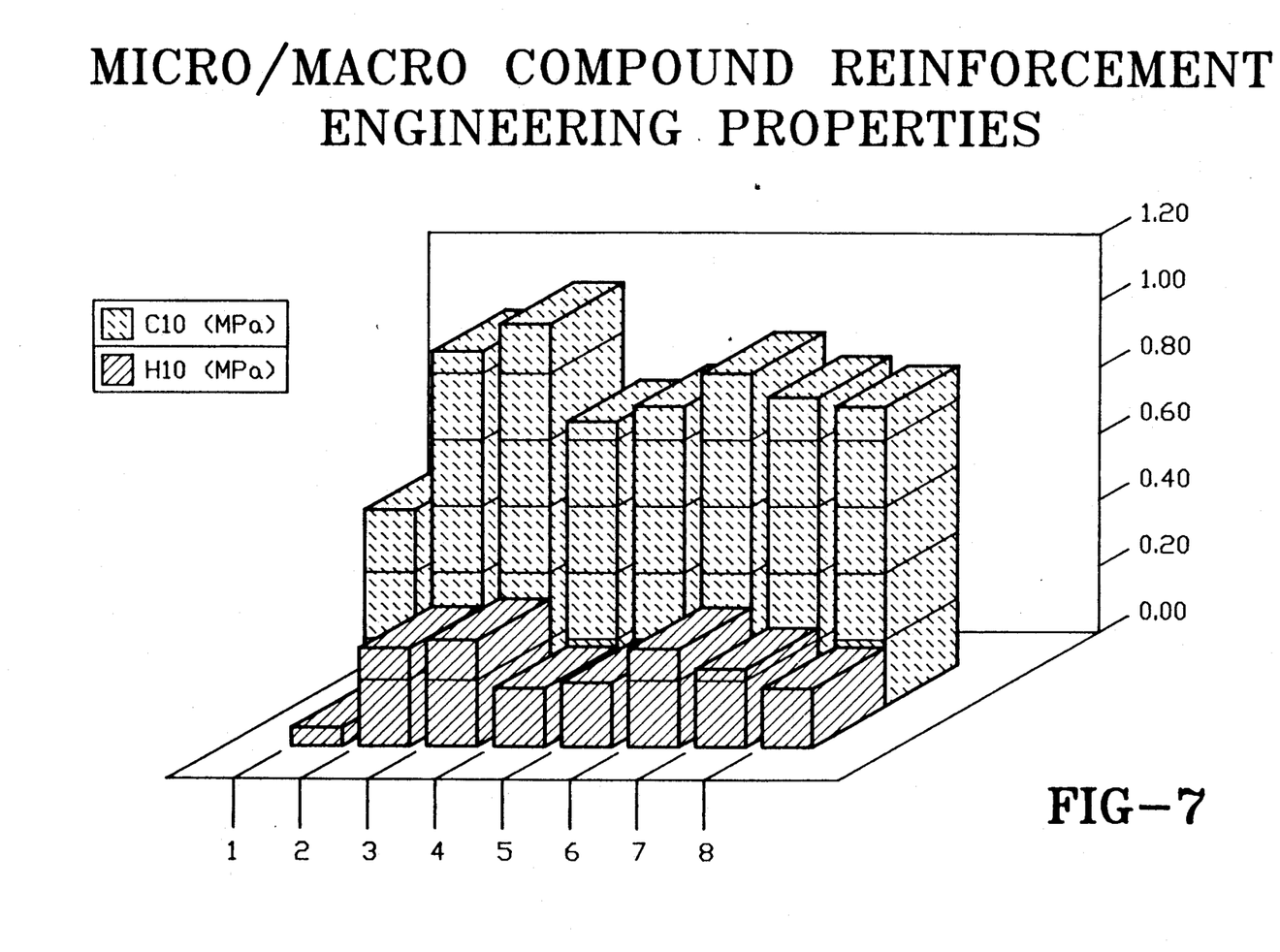
FIG. 7 illustrates elasticity data for fiber loaded samples.
Figure 8:
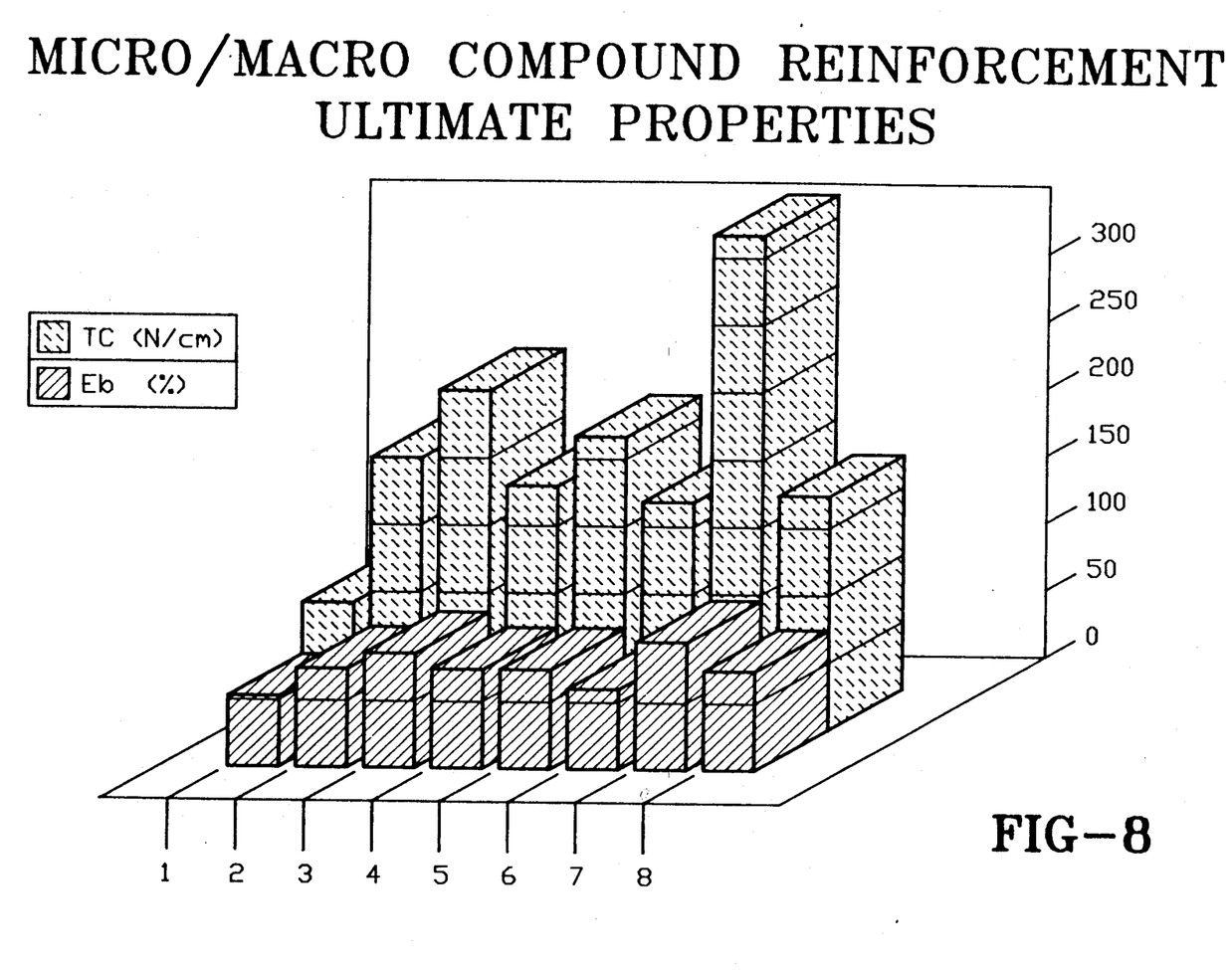
FIG. 8 illustrates ultimate (strength to break) properties of fiber loaded samples.

Engineering data showed increased set (FIG. 6) (following 100% Strain deformations) for the micro-macro fiber containing compounds (up to 14% for the Kevlar-Nylon-POY/Nylon-Natsyn ® formulation). Highest elasticity (C10) as well as hysteresis (H10) were obtained with the Nylon-Nylon-Natsyn ® materials (FIG. 7). All micro-macro formulations exhibited higher elasticity and hysteresis than the single fiber formulations: Nylon/POY (macro fiber) followed by Nylon-Natsyn ® (micro fiber).

Engineering and ultimate properties were characterized at 25° C. on specimens prepared with and against the grain directions. Conventional engineering properties (set, Mooney Rivlin C10 elastic coefficient and Hysteresis) were determined. Ultimate properties (FIG. 8) (catastrophic tearing energies Tc and ultimate extension) were also obtained on this series of compounds, at 100%/sec strain rate.

Ultimate properties (extensions and catastrophic tear energies Tc) showed significant improvement (when compared to the Control), with Kevlar/Nylon-Natsyn ® best, followed by Nylon-POY/Nylon-Natsyn ®. Ultimate extension and Tc for all micro-macro formulations were improved over both Nylon-Natsyn ® (micro fiber) and Nylon-POY (macro fiber).

Figure 9:
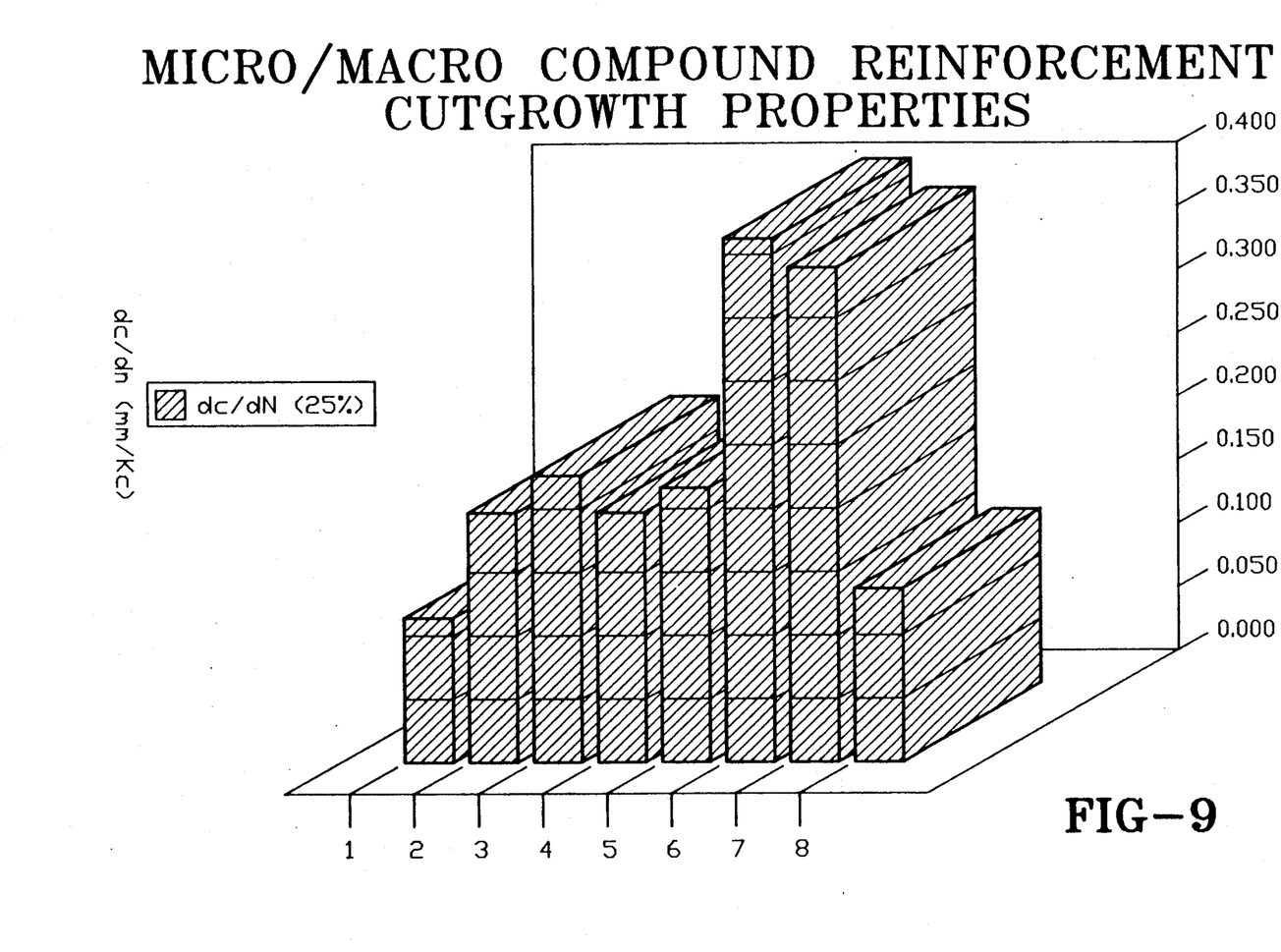
FIG. 9 illustrates crack propagating data for fiber loaded samples.
Figure 10:
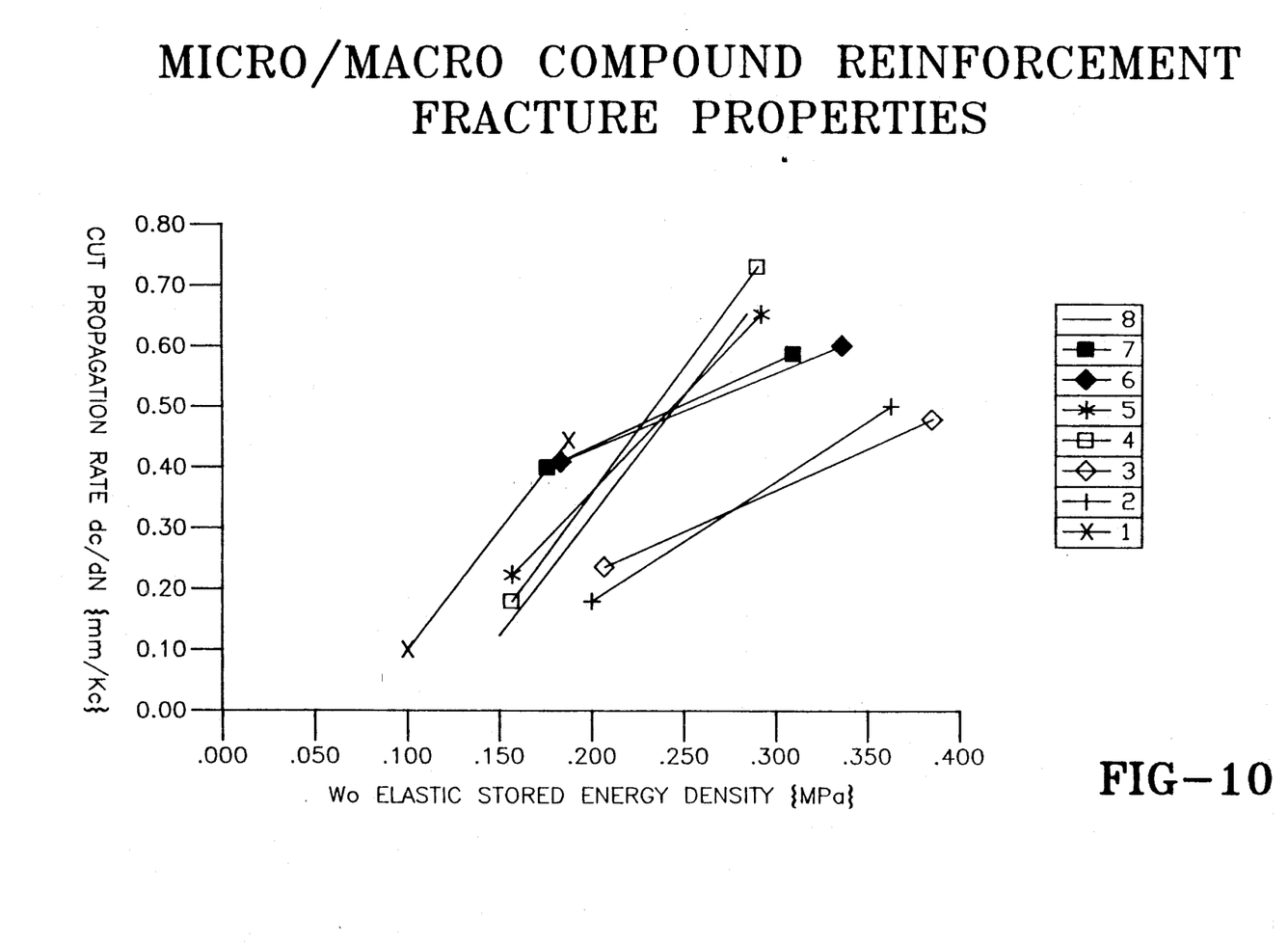
FIG. 10 illustrates elastic energy data for fiber loaded samples.

Fracture properties were determined at 25° C. from crack propagating in a direction normal to the fiber preferential orientation (against the grain) (FIG. 9). Under strain control, Nylon micro-macro formulations were ranked intermediate between the single macro fiber (Nylon-POY), which was comparable to the control, and the micro fiber (Nylon-Natsyn ®). The Kevlar ® containing formulations also exhibited cutgrowth rates equivalent to the Nylon-Natsyn ® formulation (three times faster than the control). Comparing under equal elastic energy (Wo) conditions (FIG. 10), the Nylon-Natsyn ®/Nylon POY compound presented the slowest cut-propagation rate for this series of compounds, for Wo greater than 0.15 MPa.

Fracture properties were determined in the most favorable fiber orientation (i.e. against the grain), at 25° C., under 10 Hz dynamic strain control conditions (0–25% and 0–35% peak to peak).

From the data in the Tables and Figures it can be concluded that:

1. The same or increased levels of reinforcement are attainable by varying combinations of both macro and micro fibers (Table V and FIGS. 3–10).
2. Anisotropy can be controlled by fiber (macro) content in the composite (Table V).
3. Hysteresis can be kept low while achieving reinforcement by increasing the amount of micro polymer reinforcement (FIG. 7).
4. Cut growth can be reduced using a combination of macro/micro fibers (FIGS. 9 and 10).
5. The use of more micro polymer and less macro fibers produces a desirable reinforcement level while allowing easier processing (see MPT data).

While certain embodiments of the invention have been illustrated and described, those skilled in the art will recognize that the invention may be variously modified and practiced without departing from the spirit thereof. The invention is limited only by the scope of the following claims.

What is claimed is:

1. A method for preparing reinforced polymers having engineered physical properties comprising the steps of
   (a) mixing a base polymer with 1–50% by weight micro reinforcing polymer based on the total weight of the base polymer and micro reinforcing polymer wherein said micro reinforcing polymer forms domains in situ having a length of 0.1 um to 10 um and an aspect ratio of 1–5, and mixing 1–40 phr macro short fibers having a length of 0.05 mm to 10 mm and an aspect ratio of 50–100 therewith to provide a reinforced polymer blend, and
   (b) selecting the specific amount of micro reinforcing polymer and the specific loading of macro short fibers used with reference to the properties desired in a resulting polymer matrix.

2. The method of claim 1 which comprises the further step of extruding or calendering said blend to directionally orient said short fibers.

3. The method of claim 1 which further comprises the step of selecting said micro reinforcing polymer from the group consisting of polyamides, polyesters, polyolefins, polyester polyether copolymer, polyurea and polyurethane, Syndiotactic PBD's and mixtures thereof.

4. The method of claim 1 wherein said macro short fiber is selected from the group consisting of spun or oriented polyamides, polyester, carbon fibers, cellulosics, polyolefins, metals, and mixtures thereof.

5. The method of claim 1 wherein said macro short fiber is selected from the group consisting of nylon 6, polybenzimidazole, cotton, rayon, polyethylene terephthalate, polyaromaticamide and mixtures thereof.

6. The method of claim 1 wherein said micro reinforcing polymer is selected from the group consisting of Nylon 12, polyethylene terephthalate, polybutylene terephthalate polytetramethylene glycol copolymer.

7. A polymer blend comprising
   (a) 50 to 99% by weight base polymer;
   (b) 1 to 50% by weight micro reinforcing polymer in domains having a length of 0.1 um to 10 um and an aspect ratio of 1–5; and
   (c) 1 to 40 phr macro short fibers having a length of 0.05 mm to 10 mm and an aspect ratio of 50–100.

8. The polymer blend of claim 7 wherein said micro reinforcing polymer is present in said base polymer in the form of micro fibers.

9. The polymer blend of claim 8 wherein said macro fibers and said micro fibers are directionally oriented.

10. The polymer blend of claim 7 wherein said macro short fiber is selected from the group consisting of spun or oriented polyamides, polyester, carbon fibers, cellulosics, polyolefins, metals, and mixtures thereof.

11. The polymer blend of claim 7 wherein said macro short fiber is selected from the group consisting of nylon 6, polybenzimidazole, cotton, rayon, polyethylene terephthalate, polyaromaticamides and mixtures thereof.

12. The polymer blend of claim 7 wherein said micro reinforcing polymer is selected from the group consisting of polyamides, polyaramides, polyesters, polyolefins, and mixtures thereof.

13. The polymer blend of claim 7 wherein said micro reinforcing polymer is selected from the group consisting of nylon, syndiotactic PBD, polyethylene terephthalate, polybutylene terephthalate polytetramethylene glycol copolymer, polyester polyether copolymer, polyurea and polyurethane.

14. A method for preparing reinforced polymers having engineered physical properties comprising the steps of
(a) mixing a base polymer with 1-50% by weight micro reinforcing polymer based on the total weight of the base polymer and micro reinforcing polymer wherein said micro reinforcing polymer forms domains in situ having a length of 0.1 um to 10 um and an aspect ratio of 1-5, and mixing 1-40 phr polyaromaticamide macro short fibers having a length of 0.05 mm to 10 mm and an aspect ratio of 50-100 therewith to provide a reinforced polymer blend, and
(b) selecting the specific amount of micro reinforcing polymer and the specific loading of macro short fibers used with reference to the properties desired in a resulting polymer matrix.

15. The method of claim 14 which comprises the further step of extruding or calendering said blend to directionally orient said short fibers.

16. The method of claim 14 wherein said micro reinforcing polymer is selected from the group consisting of polyamides, polyesters, polyolefins, polyester polyether copolymer, polyurea and polyurethane, Syndiotactic PBD's and mixtures thereof.

17. The method of claim 14 wherein said micro reinforcing polymer is selected from the group consisting of Nylon 12, polyethylene terephthalate, polybutylene terephthalate polytetramethylene glycol copolymer.

* * * * *